US007827615B1

(12) United States Patent
Allababidi et al.

(10) Patent No.: US 7,827,615 B1
(45) Date of Patent: Nov. 2, 2010

(54) HYBRID ROLE-BASED DISCRETIONARY ACCESS CONTROL

(75) Inventors: Mouaz Allababidi, Grand Prairie, TX (US); Balagurunathan Balasubramanian, Plano, TX (US); Bharath N. Kuruvalli, Oklahoma City, OK (US); Lih-Jong Ma, Irving, TX (US); Paul L. Taylor, Bedford, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 954 days.

(21) Appl. No.: 11/626,087

(22) Filed: Jan. 23, 2007

(51) Int. Cl.
*G06F 7/04* (2006.01)
*G06F 17/30* (2006.01)
*H04N 7/16* (2006.01)

(52) U.S. Cl. ............... 726/28; 726/1; 726/2; 726/6; 726/18; 726/21

(58) Field of Classification Search ............ 726/2, 726/4, 17, 21, 27–28, 1, 6, 18
See application file for complete search history.

(56) References Cited

U.S. PATENT DOCUMENTS

| | | | |
|---|---|---|---|
| 7,089,243 B1 * | 8/2006 | Zhang ........................... 1/1 |
| 2002/0161603 A1 * | 10/2002 | Gonzales ..................... 705/1 |
| 2003/0046639 A1 * | 3/2003 | Fai et al. ..................... 715/513 |
| 2004/0210479 A1 * | 10/2004 | Perkowski et al. ............. 705/14 |
| 2005/0149558 A1 * | 7/2005 | Zhuk ......................... 707/104.1 |
| 2006/0015416 A1 * | 1/2006 | Hoffman et al. ............... 705/28 |
| 2008/0288374 A1 * | 11/2008 | Stremler et al. ............... 705/30 |

OTHER PUBLICATIONS

Sandhu et al, "The URA97 Model for Role-Based User-Role Assignment" Proceedings of IFIP WG 11.3 Workshop on Database Security, Aug. 1997.*
Bertino et al, "TRBAC: A Temporal Role-Based Access Control Model" ACM Transactions on Information and System Security, vol. 4 No. 3, Aug. 2001.*
Sandhu et al, "The ARBAC97 Model for Role-Based Administration of Roles: Preliminary Description and Outline" ACM, 1997.*

* cited by examiner

*Primary Examiner*—Michael J Simitoski

(57) ABSTRACT

A method for access control is provided. A request is received from an administrator to modify a user role for a user. Whether the user is in a user group that belongs exclusively to the administrator is determined. Whether the administrator role permits the request is determined in response to a determination that the user is in the user group. The user role is modified based on the request in response to a determination that the administrator role permits the request, wherein the user accesses a resource based on the user role.

20 Claims, 4 Drawing Sheets

HYBRID ROLE-BASED DISCRETIONARY ACCESS CONTROL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprise administrators use access control systems to grant data users the capability to access resources. Access to resources includes the ability to read files in specific directories or in certain systems, the ability to read and write the files, and the ability to read, write, and delete the files. Role-based access control systems grant access to resources based on assigned user roles. For example, an administrator uses a role-based access control system to assign one user role (e.g., billing user) out of many user roles to a user. The assigned user role enables the user to access and modify a variety of billing records. By assigning one of many user roles to the user, the administrator does not have to evaluate individual access to each of numerous billing records when granting access to each user. However, existing role-based systems allow any administrator to assign any user role to any user. For example, any administrator can assign a billing user role to a user who works in a sales department even though the sales administrator who supervises the user does not want the user to be able to access and modify billing records.

In contrast to role-based access control systems, discretionary access control systems enable an administrator who has exclusive responsibility for a resource to be the only administrator who can grant users access to that resource. For example, a billing website administrator may be the only administrator that can grant access to the billing website to any user. However, discretionary access control systems still present certain problems. For example, the discretionary access control system enables the billing website administrator to grant access to the billing website to a user who works in a sales department even though the sales administrator who supervises the user does not want the user to be able to access the billing website.

The above-described access control systems may not satisfy the needs of an organization that needs to enforce responsibility for ensuring that security procedures are followed.

SUMMARY

Disclosed herein are improved systems and methods for access control. In some computerized method embodiments, the computer receives a request from an administrator to modify a user role for a user. The computer determines whether the user is in a user group that belongs exclusively to the administrator. If so, the computer determines whether the request is appropriate for that administrator role. If both requirements are satisfied, the computer modifies the user role and permits the user to access resources based on the user role.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Systems and methods for access control are provided to enable an organization to enforce responsibility for ensuring that security procedures are followed. The systems and methods are a hybrid approach, applying discretionary access control to users in combination with role-based rights to resources. This hybrid approach typically results in dual tests, the first test hierarchically verifying the granting authority's right to modify a user role, and the second test addressing the granting authority's role and the proposed role to be granted to the user with respect to the resource.

An administrator assigns one of many user roles to a user to grant the user access to resources, such that the administrator does not have to evaluate individual access to each of numerous resources when granting access to numerous users. An administrator can modify the user role for the user only if the administrator owns the user group to which the user belongs, which prevents any administrator from modifying the user role for any user that belongs to another administrator. An administrator cannot assign access to a resource to a user if an administrator role for the administrator does not permit the administrator access to the resource. Provided that the administrator role permits the administrator to modify the user role and the user is in the user group that belongs exclusively to the administrator, the administrator can modify the user role, and the user is able to access resources based on the modified user role.

Some embodiments include multiple levels of users and administrators, where a level of users can include a user that is also an administrator for a lower level of users and where a level of administrators can include an administrator that is also a user with respect to a higher level of administrators. To handle changing responsibilities and temporary absences, some embodiments enable an administrator to transfer responsibilities for any user from the user group that belongs to that administrator, or the user group itself, to another administrator.

Figure 1:
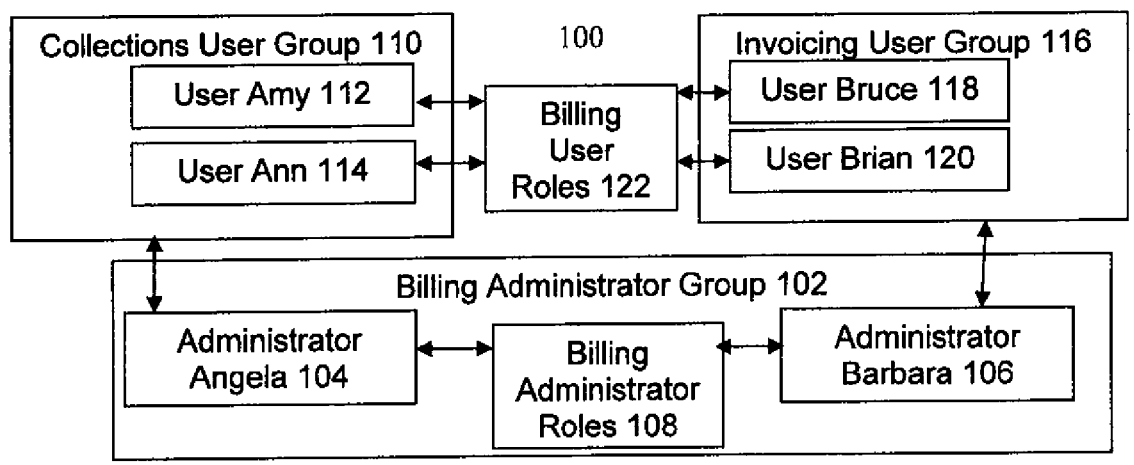
FIG. 1 shows a block diagram of an illustrative access control system, according to some embodiments of the present disclosure

Turning now to FIG. 1, a block diagram of an illustrative access control system 100 is depicted. The system 100 includes a billing administrator group 102, which includes administrator Angela 104 and an administrator Barbara 106. The access to resources that billing administrators have in the system 100 is specified by billing administrator roles 108. Each administrator can control access to resources for a group of users. For example, administrator Angela 104 controls access to billing resources for a collections user group 110 that includes a user Amy 112 and a user Ann 114. Similarly, administrator Barbara 106 controls access to billing resources for an invoicing user group 116 that includes a user Bruce 118 and a user Brian 120. The access to resources that billing users have in the system 100 is specified by billing users roles 122. The numbers and types of each administrator group, administrator, administrator roles, user group, user, and user roles in FIG. 1 are depicted for the purpose of an illustrative example only, and other embodiments may be recognized by those of skill in the art.

Because the collections user group 110 belongs exclusively to the administrator Angela 104, the administrator Barbara 106 cannot modify the user role for the user Amy 112 in the collections user group 110. Although the administrator Angela 104 can create the user role for the user Amy 112 and can modify the user role for the user Amy 112, the created and modified user roles cannot include any access to resources greater than the access to resources in the billing administrator roles 108, which specifies the access to resources for the administrator Angela 104.

Figure 2:
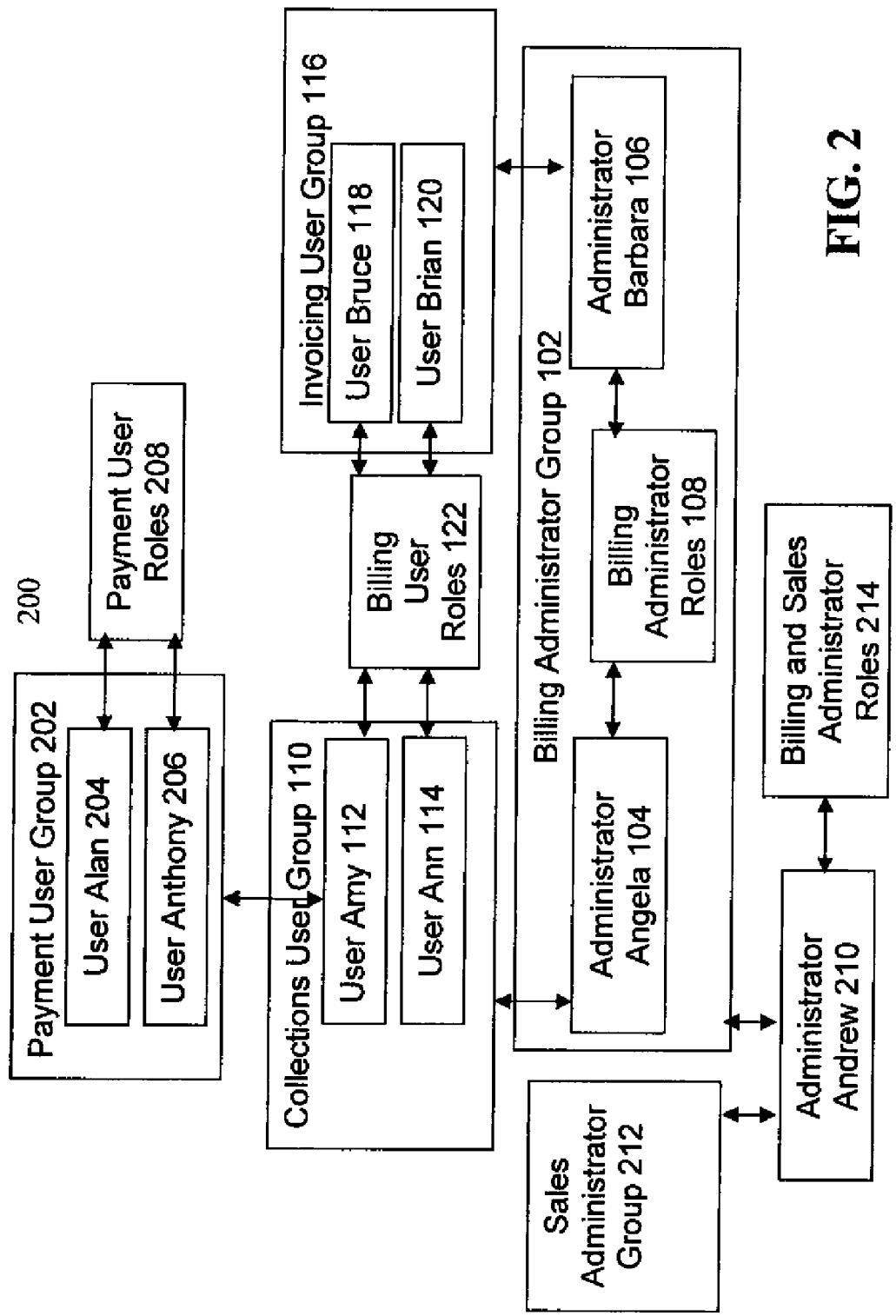
FIG. 2 shows a block diagram of an illustrative expanded access control system according to some embodiments of the present disclosure.

Turning now to FIG. 2, a block diagram of an illustrative expanded access control system 200 is depicted according to some embodiments of the present disclosure. The system 200 includes the system 100, as well as additional users and an additional administrator. The numbers and types of each administrator group, administrator, administrator roles, user group, user, and user roles in FIG. 2 are depicted for the purpose of an illustrative example only, and other embodiments may be recognized by those of skill in the art.

The user Amy 112, a member of the collections user group 110, controls access to resources for a payment user group 202 that includes a user Alan 204 and a user Anthony 206. The access to resources that payment users are assigned in the system 200 is specified by payment user roles 208. Although the user Amy 112 can create the user role for the user Alan 204 and can modify the user role for the user Alan 204, the created and modified user roles cannot include any access to resources greater than the access to resources in the billing user roles 122, which specifies the access to resources for the user Amy 112. Because the payment user group 202 belongs exclusively to the administrator Amy 112, the administrator Barbara 106 cannot modify the user role for the user Alan 204 in the payment user group 202.

An administrator Andrew 210 controls access to resources for a sales administrator group 212 and the billing administrator group 102 that includes the administrator Angela 104. The access to resources that the administrator Andrew 210 has in the system 200 is specified by billing and sales administrator roles 214. Although the administrator Andrew 210 can create the billing administrator roles 108 for the user administrator Angela 104 and can modify the billing administrator roles 108 for the administrator Angela 104, the created and modified billing administrator roles 108 cannot include any access to resources greater than the access to resources in the billing and sales administrator roles 214, which specifies the access to resources for the administrator Andrew 210. Because the billing administrator group 102 belongs exclusively to the administrator Andrew 210, the administrator Barbara 106 cannot modify the billing administrator roles 108 for the administrator Angela 104 in the billing administrator group 102.

Figure 3:
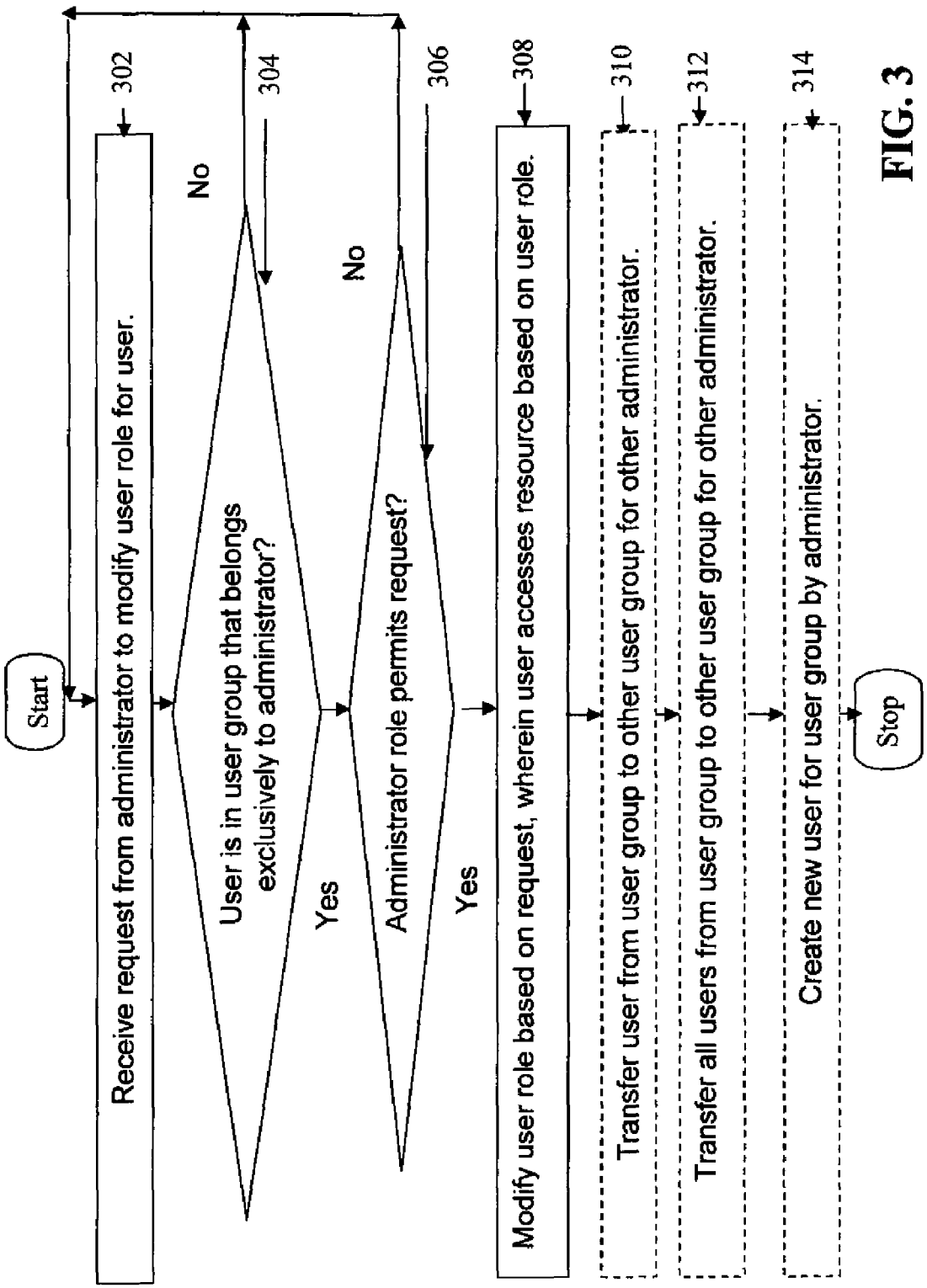
FIG. 3 shows an illustrative access control method according to some embodiments of the present disclosure.

Turning now to FIG. 3, an illustrative access control method is depicted according to some embodiments of the present disclosure. Executing the access control method depicted in FIG. 3 results in modifying a user role for a user based on a request from an administrator in response to a determination that the user is in a user group that belongs exclusively to the administrator and a determination that an administrator role for the administrator permits the request.

In box 302, an access control tool receives a request from an administrator to modify a user role for a user. For example, the administrator Angela 104 requests to modify the billing user roles 122 for the user Amy 112, wherein the billing user roles 122 is based on the billing administrator roles 108 for the administrator Angela 104.

In box 304, the access control tool determines whether the user is in a user group that belongs exclusively to the administrator. For example, the access control tool determines where the user Amy 112 is in the collections user group 110 that belongs exclusively to the administrator Angela 104. If the access control tool determines that the user is in the user group that belongs exclusively to the administrator, the method continues to box 306. If the access control tool determines that the user is not in the user group that belongs exclusively to the administrator, the method returns to box 302 to wait for more requests to modify user roles.

In box 306, the access control tool determines whether the administrator role permits the request. For example, the access control tool determines whether the billing administrator roles 108 permit the request by the administrator Angela 104 to modify the billing user roles 108 for the user Amy 112. If the access control tool determines that the administrator role permits the request, the method continues to box 308. If the access control tool determines that the administrator role does not permit the request, the method returns to box 302 to wait for more requests to modify user roles.

In box 308, the access control tool modifies the user role based on the request, wherein the user accesses a resource based on the user role. For example, the access control tool modifies the billing user roles 122 for the user Amy 112 based on the request from the administrator Angela 104. Although the administrator Angela 104 modifies the billing user roles 122 for the user Amy 112, the modified billing user roles 122 cannot include access to resources greater than the access to resources in the billing administrator roles 108 for the administrator Angela 104. After the access control tool modifies the billing user roles 122 for the user Amy 112 based on the request by the administrator Angela 104, the user Amy 112 accesses a resource based on the billing user roles 122.

In box 310, as part of modifying the user role the access control tool can optionally transfer the user from the user group to another user group for another administrator. For example, the user Ann 114 in the collections user group 110 is transferred to the invoicing user group 116 that belongs exclusively to the administrator Barbara 106. Before the transfer, the user Ann 114 had access to resources based on the billing user roles 122 assigned by the administrator Angela 104 to the user Ann 114 in the collections user group 110, which exclusively belongs to the administrator Angela 114. After the transfer, the user Ann 114 has access to resources based on the billing user roles 122 assigned by the administrator Barbara 106 to the user Ann 114 in the invoicing user group 116, which exclusively belongs to the administrator Barbara 106.

The transfer of the user Ann 114 can be conducted by the administrator Angela 104, the administrator Andrew 210 who is the administrator for the administrator Angela 104, or, in some embodiments, a super administrator who is the administrator for all of the system 200. The duration of the transfer of the user Ann 114 from the collections user group 110 to the invoicing user group 116 can be a temporary transfer, such as on a day when the administrator Angela 104 is absent and the user Ann 114 needs access increased to resources, or a permanent transfer, such as when the user Ann 114 is assigned to work in the invoicing user group 116 and no longer works in the collections user group 110.

In box 312, as part of modifying the user roles, the access control tool can optionally transfer a user group to another user group for another administrator. For example, the administrator Angela 104 who administers the collections user group 110 is transferred to a customer care administrator group. Therefore, the administrator Angela 104 transfers the collections user group 110 to the invoicing user group 116, which exclusively belongs to the administrator Barbara 106. Before the transfer, the users in the collections user group 110 accessed resources based on the billing user roles 122 assigned by the administrator Angela 104. After the transfer, the users formerly in the collections user group 110 access resources based on the billing user roles 122 assigned by the administrator Barbara 106 to users in the invoicing user group 116, which exclusively belongs to the administrator Barbara 106.

The transfer of the collections user group 110 can be conducted by the administrator Angela 104, the administrator Andrew 210 who is the administrator for the administrator Angela 104, or a super administrator who is an administrator for all of the system 200. The duration of the transfer of the collections user group 110 to the invoicing user group 116 can be a temporary transfer, such as on a day when the administrator Angela 104 is absent and the users in the collections user group 110 need access increased to resources, or a permanent transfer, such as when the administrator Angela 104 who administers the collections user group 110 is transferred to work in the customer care administrator group and no longer works in the billing administrator group 102.

In box 314, if the request is to create a user role for a given user, the access control tool can create a new user for the user group by the administrator. For example, the administrator Angela 104 can create a new user Andy for the collections user group 110 to enable Andy, a new hire or a transfer, who is now working under the administrator Angela 104 to access resources. The resources that the new user Andy accesses depend on the user role that the administrator Angela assigns from the billing user roles 122 to the new user Andy.

For example, the collections user group 110 can include three levels of collections users, including collections users that are in training, regular collections users, and senior collections users, with each level of collections users assigned a different role in the billing user roles 122. Each different role in the billing user roles 122 enables users assigned the role to access a different amount of resources. For example, collections users that are being trained can view billing data but cannot modify billing data, whereas senior collections users can review and modify billing data entered by regular collections users.

Figure 4:
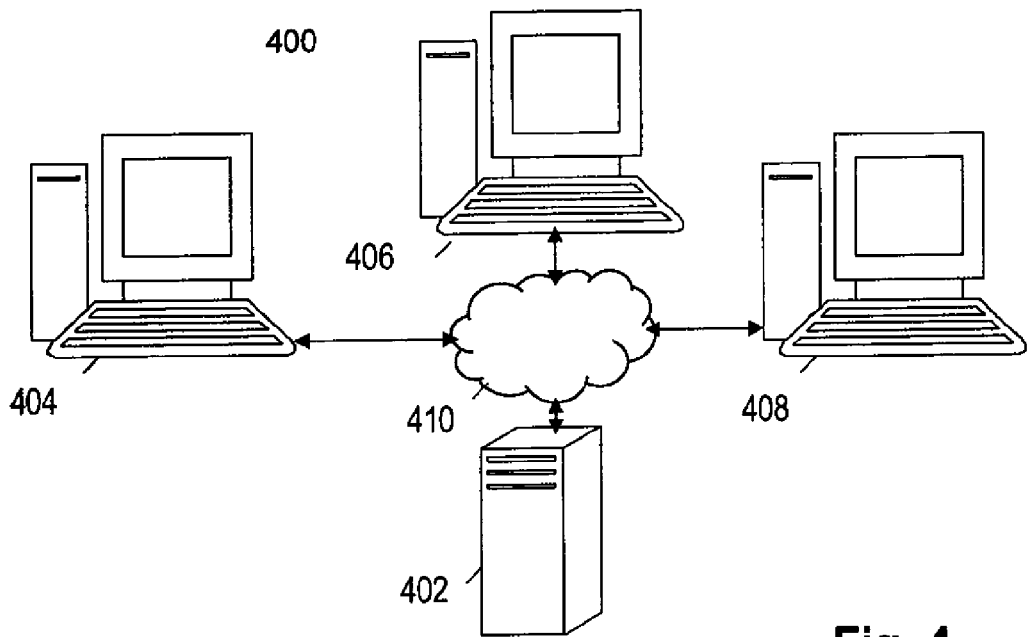
FIG. 4 shows an illustrative distributed access control system according to some embodiments of the present disclosure.

FIG. 4 shows an illustrative distributed access control system 400 according to some embodiments of the present disclosure. The system 400 includes a server 402, a first desktop computer 404, a second desktop computer 406, a third desktop computer 408, and a network 410. Desktop computers 404-408 are depicted in FIG. 4, although any electronic device having some amount of computing power coupled to a user interface can be configured to carry out the methods disclosed herein. The server 402 and the desktop computers 404-408 can communicate with each other through the network 410. The administrators and the users depicted in FIG. 2 can use the desktop computers 404-408 to execute access control methods according to some embodiments of the present disclosure. Software for the access control tool can be centrally located in the server 402, divided throughout each of the desktop computers 404-408, or distributed in any combination through the server 402 and the desktop computers 404-408. The numbers and types of the server 402 and the desktop computers 404-408 in FIG. 4 are depicted for the purpose of an illustrative example only, and should not be considered limiting.

Figure 5:
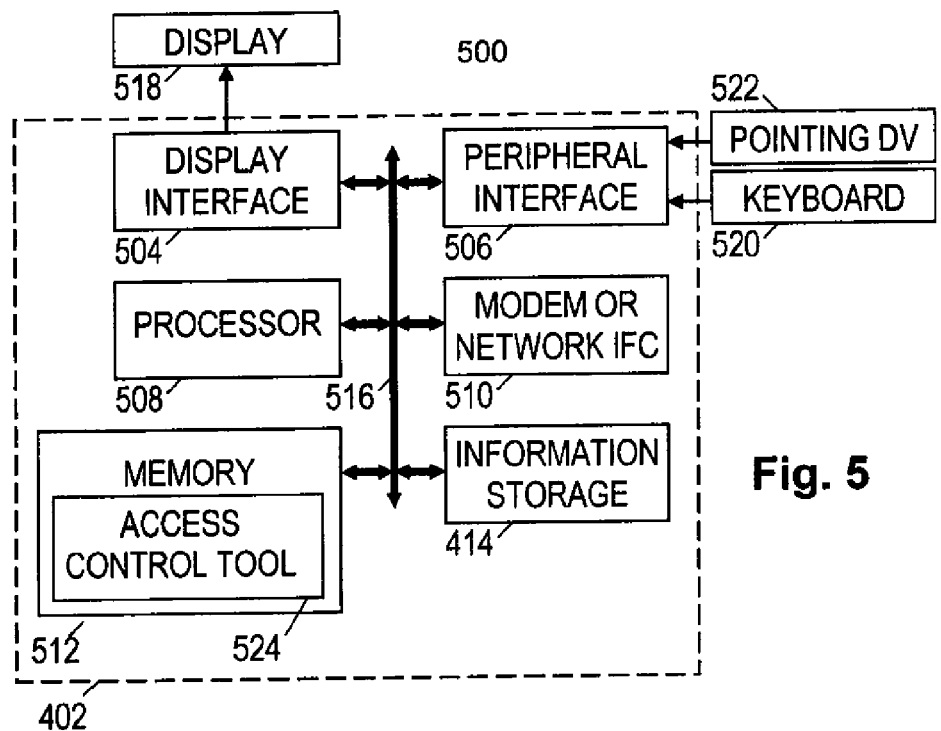
FIG. 5 shows a block diagram of an illustrative server for an access control system according to some embodiments of the present disclosure.

Turning now to FIG. 5, a block diagram 500 of the illustrative server 402 for an access control system is depicted according to some embodiments of the present disclosure. The server 402 may comprise a display interface 504, a peripheral interface 506, a processor 508, a modem or other suitable network interface 510, a memory 512, an information storage device 514, and a bus 516. The server 402 may be a bus-based computer, with the bus 516 interconnecting the other elements and carrying communications between them. The display interface 504 may take the form of a video card or other suitable display interface that accepts information from the bus 516 and transforms it into a form suitable for a display 518. Conversely, the peripheral interface 506 may accept signals from a keyboard 520, and other input devices such as a pointing device 522, and transform them into a form suitable for communication on the bus 516. Such forms suitable for communication may include a request to modify a user role.

The processor 508 gathers information from other system elements, including input data from the peripheral interface 506, and program instructions and other data from the memory 512, the information storage device 514, or from a remote location via the network interface 510. The processor 508 carries out the program instructions and processes the data accordingly. The processor 508 executes instructions for an access control tool 524, instructions that are stored in the memory 512. The program instructions may further configure the processor 508 to execute instructions for the access control tool 524 to send data to other system elements, comprising information for the user which may be communicated via the display interface 504 and the display 518, information such as an assigned user role.

The network interface 510 enables the processor 508 to communicate with remote systems via a network. The memory 512 may serve as a low-latency temporary store of information for the processor 508, and the information storage device 514 may serve as a long term (but higher latency) store of information, including information such as a request to modify a user role.

The processor 508, and hence the server 402 as a whole, operates in accordance with one or more programs stored on the information storage device 514, such the access control tool 524. The processor 508 may copy portions of the programs into the memory 512 for faster access, and may switch between programs or carry out additional programs in response to user actuation of the input device. The additional programs, such as the access control tool 524, may be retrieved from the information storage device 514 or may be retrieved from remote locations via the network interface 510. One or more of these programs, including the access control tool 524, configures the server 402 to carry out at least one of the access control methods disclosed herein.

The server 402 is described as a general server, although any electronic device having some amount of computing power coupled to a user interface may be configured to carry out the methods disclosed herein. Among other things, personal computers, portable computers, personal digital assistants (PDAs) and mobile phones may be configured to carry out aspects of the disclosed enterprise infrastructure development methods.

The display 518 may be a video monitor, but may take many alternative forms such as a printer, a speaker, or other means for communicating information to a user, information such as an assigned user role. The input device for the user interface is shown as the keyboard 520, but may similarly take many alternative forms such as a button, a mouse, a keypad, a dial, a motion sensor, a camera, a microphone or other means for receiving information from a user, information such as a request to modify a user role.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

What is claimed is:

1. A computer implemented method, comprising:
   receiving a request from a particular administrative user to modify a user role for a user, wherein the user role defines access permissions for the user to a resource, wherein the particular administrative user controls roles of users in a particular user group that belongs exclusively to the particular administrative user, and wherein the particular administrative user also has an administrator role that defines permissible actions for one or more administrative users;
   determining by a computer processor whether the user is a member of the particular user group that belongs exclusively to the particular administrative user;
   determining by a computer processor whether the administrator role permits the request; and
   modifying by a computer processor the user role based on the request in response to a determination that the user is a member of the particular user group and that the administrator role permits the request.

2. The method of claim 1 wherein the user is a first user and the user role is a first user role and wherein a second user is in a second user group that belongs exclusively to the first user, a second user role for the second user is based on the first user role.

3. The method of claim 1 further comprising transferring the user from the particular user group to another user group that belongs exclusively to another administrative user.

4. The method of claim 3 wherein transferring the user from the particular user group is an action limited to execution by at least one of the particular administrative user, a super administrative user, and an administrative user for the particular administrative user.

5. The method of claim 3 wherein the user role is based on another administrator role associated with the other administrative user.

6. The method of claim 3 wherein effects are temporary from transferring the user from the particular user group to the other user group that belongs exclusively to the other administrative user.

7. The method of claim 1 further comprising transferring the particular user group to another user group belonging exclusively to another administrative user.

8. The method of claim 1 further comprising creating another user for the particular user group by the particular administrative user.

9. A computer implemented system, comprising:
   a user interface to receive a request from a particular administrative user to modify a user role for a user, wherein the user role defines access permissions for the user to a resource, wherein the particular administrative user controls roles of users in a particular user group that belongs exclusively to the particular administrative user, and wherein the particular administrative user also has an administrator role that defines permissible actions for one or more administrative users; and
   an access control tool to determine whether the user is a member of the particular user group that belongs exclusively to the particular administrative user, to determine whether the administrator role permits the request, and to modify the user role based on the request in response to a determination that the user is a member of the particular user group and a determination that the administrator role permits the request.

10. The system of claim 9 wherein the user is a first user and the user role is a first user role and wherein a second user is in a second user group that belongs exclusively to the first user, a second user role for the second user is based on the first user role.

11. The system of claim 9 wherein the access control tool is further operable to transfer the user from the particular user group to another user group that belongs exclusively to another administrative user.

12. The system of claim 11 wherein the access control tool is further operable to transfer the user from the particular user group to the other user group that belongs exclusively to the other administrative user only when executed by at least one of the particular administrative user, a super administrative user, and an administrative user for the particular administrative user.

13. The system of claim 11 wherein the user role is based on another administrator role associated with the other administrative user.

14. The system of claim 9 wherein the access control tool is further operable to enable the particular administrative user to create another user for the particular user group.

15. A computer system for granting a user access, comprising:
   a computer processor; and
   instructions when executed by the computer processor implement a method including:
   in response to a particular administrative user attempting to modify a role of the user, verifying whether the user is a member of a particular user group that belongs exclusively to the particular administrative user, and verifying whether a role of the particular administrative user permits the modification, and further modifying the role of the user when the user belongs exclusively to the particular user group and when the role of the particular administrative user permits the modification.

16. The computer system of claim 15 wherein the user is a first user and the user role is a first user role and wherein a second user is in a second user group that belongs exclusively to the first user, a second user role for the second user is based on the first user role.

17. The computer system of claim 15, wherein the instructions when executed by the computer processor further implement transferring the user from the particular user group to another user group belonging exclusively to another administrative user.

18. The computer system of claim 17 wherein transferring the user from the particular user group is an action limited to execution by at least one of the particular administrative user, a super administrative user, and an administrative user for the particular administrative user.

19. The computer system of claim 17 wherein the user role is based on another administrator role associated with the other administrative user.

20. The computer system of claim 15, wherein the instructions when executed by the processor further implement transferring the particular user group to another user group belonging exclusively to another administrative user.

* * * * *